United States Patent
Galvin

(10) Patent No.: US 8,463,939 B1
(45) Date of Patent: Jun. 11, 2013

(54) SYSTEM AND METHOD FOR OPTIMIZED AND DISTRIBUTED ROUTING OF INTERACTIONS

(76) Inventor: Brian R. Galvin, Seabeck, WA (US)

( * ) Notice: Subject to any disclaimer, the term of this patent is extended or adjusted under 35 U.S.C. 154(b) by 0 days.

(21) Appl. No.: 13/550,587

(22) Filed: Jul. 16, 2012

Related U.S. Application Data

(63) Continuation-in-part of application No. 13/357,502, filed on Jan. 24, 2012.

(60) Provisional application No. 61/607,909, filed on Mar. 7, 2012.

(51) Int. Cl.
*G06F 15/173* (2006.01)

(52) U.S. Cl.
USPC ... 709/238; 705/14.4; 705/14.53; 379/265.01

(58) Field of Classification Search
USPC .......... 705/14.4, 14.53; 709/238; 379/265.01
See application file for complete search history.

(56) References Cited

U.S. PATENT DOCUMENTS

| | | |
|---|---|---|
| 6,556,671 B1 | 4/2003 | Beauvois |
| 2010/0268605 A1* | 10/2010 | Waelbroeck et al. ...... 705/14.53 |
| 2011/0182418 A1* | 7/2011 | Anisimov et al. ........ 379/265.01 |
| 2011/0255683 A1 | 10/2011 | Flockhart et al. |

* cited by examiner

*Primary Examiner* — Kyung H Shin
(74) *Attorney, Agent, or Firm* — Galvin Patent Law LLC; Brian R. Galvin

(57) ABSTRACT

A system for optimized and distributed routing of interactions, comprising a plurality of media servers operating adapted to handle interactions of one or more specific media types, a statistics server, a routing database, and a routing server. Upon receiving or initiating an interaction of a specific media type, a first media server from the media servers sends a route request message comprising at least an interaction identifier and a collection of interaction-specific data to the routing server, the statistics server receives event notifications from the media servers and computes one or more statistics, and the routing server executes, using statistical data from the statistics server and data from the routing database, a routing script in response to the route request message and sends a response to the first media server directing it to route the interaction to a specific target resource.

6 Claims, 9 Drawing Sheets

SYSTEM AND METHOD FOR OPTIMIZED AND DISTRIBUTED ROUTING OF INTERACTIONS

CROSS-REFERENCE TO RELATED APPLICATIONS

This application claims priority to U.S. provisional patent application Ser. No. 61/607,909, titled "SYSTEM AND METHOD FOR OPTIMIZED AND DISTRIBUTED ROUTING OF INTERACTIONS," which was filed on Mar. 7, 2012. This application is a continuation-in-part of U.S. patent application Ser. No. 13/357,502, titled "SYSTEM AND METHOD FOR CONDUCTING REAL-TIME AND HISTORICAL ANALYSIS OF COMPLEX CUSTOMER CARE PROCESSES", filed on Jan. 24, 2012, the entire of specification of which is incorporated herein by reference.

BACKGROUND OF THE INVENTION

1. Field of the Invention

The invention relates to the field of interaction routing, and particularly to the field of optimized routing of customer interactions in multimedia contact centers.

2. Discussion of the State of the Art

In the last forty years, "customer care" using remote call or contact centers (that is, remote from the perspective of the customer being cared for, as opposed to in-person customer care at, for example, a retail establishment, which is clearly not remote) has become a major activity of large corporations. Various estimates indicate that somewhere between 2 and 5 million people in the United States alone currently work on call or contact centers (in the art, "call center" generally refers to a center that handles only phone calls, while "contact center" refers to a center that handles not only calls but also other customer communication channels, such as electronic mail ("email"), instant messaging ("IM"), short message service ("SMS"), chat, web sessions, and so forth; in this document, applicant will generally use the term "contact center", which should be understood to mean either call centers or contact centers, as just defined).

Contact centers are home to some of the more complex business processes engaged in by enterprises, since the process is typically carried out not only by employees or agents of the enterprise "running" the contact center, but also by the customers of the enterprise. Since an enterprise's customers will generally have goals that are different from, and often competitive with, the goals of the enterprise, and since customer care personnel (contact center "agents") will often also have their own goals or preferences that may not always match those of the enterprise, the fact is that contact center processes lie somewhere between collaborative processes and purely competitive processes (like a courtroom trial). The existence of multiple competing or at least non-aligned stakeholders jointly carrying out a process means that, even when great effort is expended to design an efficient process, what actually occurs is usually a dynamic, surprising, and intrinsically complex mix of good and bad sub-processes, many of which occur without the direction or even knowledge of an enterprise's customer care management team.

Despite the complexity of contact center operations, it is a matter of significant economic importance to try to improve both the productivity of contact centers (from the enterprise's perspective) and the quality of the experience of the customers they serve. Accordingly, a number of well-known routing approaches have been adopted in the art, with the goal of getting each interaction to a most appropriate resource (resource being an agent or other person, or automated system, suitable for fulfilling a customer's service needs). For example, queues are still used in many contact centers, with most queues being first-in-first-out (FIFO) queues. In some cases in the art, enhancements to queue-based routing include use of priority scores for interaction, with higher-priority interactions being pushed "up" in queues to get quicker service. Queue-based routing has the advantage of simplicity and low cost, and is generally still in widespread use in applications where interactions are generally commodity-like or very similar (and therefore where the choice of a particular agent for a particular customer may not be that helpful).

An extension of the basic queuing approach is skills-based routing, which was introduced in the mid-1990s. In skills-based routing, each "agent" or customer service representative is assigned certain interaction-handling skills, and calls are queued to groups of agents who have the requisite skills needed for the call. Skills-based routing introduced the idea that among a large population of agents, some would be much more appropriate to handle a particular customer's need than others, and further that by assigning skills to agents and expressing the skills needed to serve a particular customer need, overall customer satisfaction would improve even as productivity did in parallel. However, in the art most skills are assigned administratively (sometimes based on training completed, but often based on work assignment or workgroup policies), and do not reflect actual capabilities of agents. Moreover, it is common practice in the art to "move interactions" by reassigning skills. That is, when traffic of inbound interactions begins to pile up in one group or skill set of a contact center, staff will often reassign skills of members in other groups so that the overloaded group temporarily becomes larger (and thereby clears the backlog of queued interactions). This common practice in the art further erodes any connection between skills as assigned and actual capabilities of agents, and in general basic skills-based routing has been unable to handle the complex needs of larger contact centers.

In one approach known in the art, the concept of a "virtual waiting room" where customers looking to be served and agents available to serve customers can virtually congregate, and a matching of customers to available agents can be made, much like people would do on their own if they were in a waiting room together. This approach, while attractive on the surface, is very impractical. For example, when there is a surplus of customers awaiting service, the waiting room approach becomes nothing more than determining, one agent at a time, which customer (among those the agent is eligible to serve) has the greatest need for prompt service; similarly, in an agent surplus situation, each time a customer "arrives" in the waiting room, a best-fit agent can be selected. Because generally there will be either an agent or a customer surplus, in most cases this waiting room approach is really nothing more than skills-based routing with a better metaphor.

Finally, because none of the three approaches just described satisfactorily meets the needs of complex routing situations typical in large contact centers, another approach that has become common in the art is the generic routing scripting approach. In this approach, a routing strategy designer application is used to build complex routing strategies, and each time an interaction requiring services appears (either by arriving, in the case of inbound interactions, or being initiated, in the case of outbound interactions), an appropriate script is loaded into an execution environment and executed on behalf of that interaction. An advantage of this approach is its open-endedness, as users can construct complex routing strategies that embody complex business rules. But this approach suffers from the disadvantage that it is very complex, and requires a high degree of technical skill on the part of the routing strategy designer. This requirement for skilled designers also generally means that changes in routing strategies occur only rarely, generally as part of a major technology implementation project (thus agile adoption and adaptation of enhanced business rules is not really an option).

Another general issue with the state of the art in routing is that, in general, one routing engine is used to handle all the routing for a given agent population. In some very large enterprises, routing might be subdivided based on organizational or geographic boundaries, but in most cases a single routing engine makes all routing decisions for a single enterprise (or for several). This means that the routing engine has to be made very efficient so that it can handle the scale of computation needed for large complex routing problems, and it means that the routing engine may be a point of failure (although hot standby and other fault-tolerant techniques are commonly used in the art). Also, routing engines, automated call distributors (ACDs), and queuing and routing systems in general known in the art today generally limit themselves to considering "available" agents (for example, those who have manually or automatically been placed in a "READY" status). Because of this, routing systems in the art generally require a real-time knowledge of the state of each potential target (particularly agents). In large routing systems, having to maintain continuous real-time state information about a large number of agents, and having to process routing rules within a centralized routing engine, have tended to require very complex systems that are difficult to implement, configure, and maintain.

What is needed is a system for providing flexible, easy-to-use, and powerful routing capabilities for modern contact centers. Moreover, such a system should be easily deployed in a highly distributed architecture; in order that large scale globally optimized routing decisions can be made without using a single central routing engine.

SUMMARY OF THE INVENTION

Accordingly, the inventor has conceived and reduced to practice, in a preferred embodiment of the invention, a system and various methods for optimized and distributed routing of interactions.

According to a preferred embodiment of the invention, a system for optimized and distributed routing of interactions, comprising a plurality of media servers operating adapted to handle interactions of one or more specific media types, a statistics server, a routing database, and a routing server, is disclosed. Upon receiving or initiating an interaction of a specific media type, a first media server from the media servers sends a route request message comprising at least an interaction identifier and a collection of interaction-specific data to the routing server, the statistics server receives event notifications from the media servers and computes one or more statistics, and the routing server executes, using statistical data from the statistics server and data from the routing database, a routing script in response to the route request message and sends a response to the first media server directing it to route the interaction to a specific target resource. The routing script comprises at least the steps of generating a list of all possible routing targets for the interaction regardless of the real-time state of the routing targets, computing a plurality of fitness parameters for each routing target in the generated list, sorting the generated list based on one or more of the fitness parameters using a sorting rule to obtain a sorted target list, and using a target selection rule to consider a plurality of routing targets starting at the beginning of the sorted target list until a routing target is selected.

According to another preferred embodiment of the invention, a method for optimized and distributed routing of interactions is disclosed, comprising the steps of: (a) receiving or initiating an interaction at an interpreter server operating on a network-attached computer; (b) generating a list of all possible routing targets for the interaction based regardless of the real-time state of the routing targets using at least an interaction identifier and a plurality of data elements pertaining to the interaction; (c) computing a plurality of fitness parameters for each routing target in the generated list; (d) sorting the generated list based on one or more of the fitness parameters using a sorting rule to obtain a sorted target list; (e) using a target selection rule to consider a plurality of routing targets starting at the beginning of the sorted target list until a routing target is selected; and (f) routing the interaction to the selected routing target.

According to another embodiment of the invention, the target selection rule comprises the steps of: (e1) sending the interaction to the highest untested routing target in the sorted list; (e2) if the routing target to which the interaction was sent does not respond to the interaction, returning the interaction to the interpreter server; (e3) dropping the routing target that did not respond from the sorted list; and (e4) returning to step (e1) unless the sorted list is empty.

According to another embodiment of the invention, the target selection rule comprises the steps of: (e1) offering the interaction to the highest untested routing target in the sorted list; (e2) if the routing target to which the interaction was offered does not respond to the offer or declines the offer, dropping the non-responsive routing target from the sorted list and returning to step (e1); (e3) if the routing target to which the interaction was offered accepts the offer, selecting the accepting routing target as the final routing target for the interaction and proceeding to step (f); (e4) if the sorted list is empty and no routing target was selected, executing a target unavailable script in the interpreter server for the interaction.

According to another embodiment of the invention, the target selection rule comprises the steps of: (e1) determining a plurality of combined fitness scores; (e2) determining an optimal grouping of potential routing targets by an optimization server executing on a network-attached computer, using one or more optimization algorithms to determine a global optimum, a regional optimum, or a local optimum grouping based on a current or expected population of interactions requiring routing, thereby generating an optimal target list; (e3) offering the interaction to the highest untested routing target in the optimal list; (e4) if the routing target to which the interaction was offered does not respond to the offer or declines the offer, dropping the non-responsive routing target from the optimal list and returning to step (e3); (e5) if the routing target to which the interaction was offered accepts the offer, selecting the accepting routing target as the final routing target for the interaction and proceeding to step (f); (e6) if the optimal list is empty and no routing target was selected, executing a target unavailable script in the interpreter server for the interaction.

According to a preferred embodiment of the invention, a system for optimized and distributed routing of interactions, comprising a plurality of interpreter servers operating on network-attached computers, each adapted to interpret a plurality of scripts to manage a plurality of interactions of one or more specific media types, a plurality of statistics servers operating on a network-attached computer and coupled to one or more of the plurality of interpreter servers, a historical statistics database accessible via a network and adapted to receive and store statistical information from the plurality of statistics servers, and a plurality of optimization servers operating on network-attached computers, is disclosed. Upon receiving or initiating an interaction of a specific media type, a first interpreter from the plurality of interpreter loads a first script based at least on an interaction identifier and a collection of interaction-specific data. The plurality of statistics servers receive event notifications from the plurality of interpreter servers regarding events pertaining to a plurality of specific interactions handled by the plurality of interpreter servers, and the interpreter server executes, using statistical data from the statistics server and data from the historical statistics database, a script to determine at least a specific handling policy for the interaction of a specific media type, and thereby routes the interaction to a specific target resource. The script comprises at least the steps of generating a list of all possible routing targets for the interaction regardless of the real-time state of the routing targets, computing a plurality of fitness parameters for each routing target in the generated list, sorting the generated list based on one or more of the fitness parameters using a sorting rule to obtain a sorted target list, and using a target selection rule to consider a plurality of routing targets starting at the beginning of the sorted target list until a routing target is selected.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
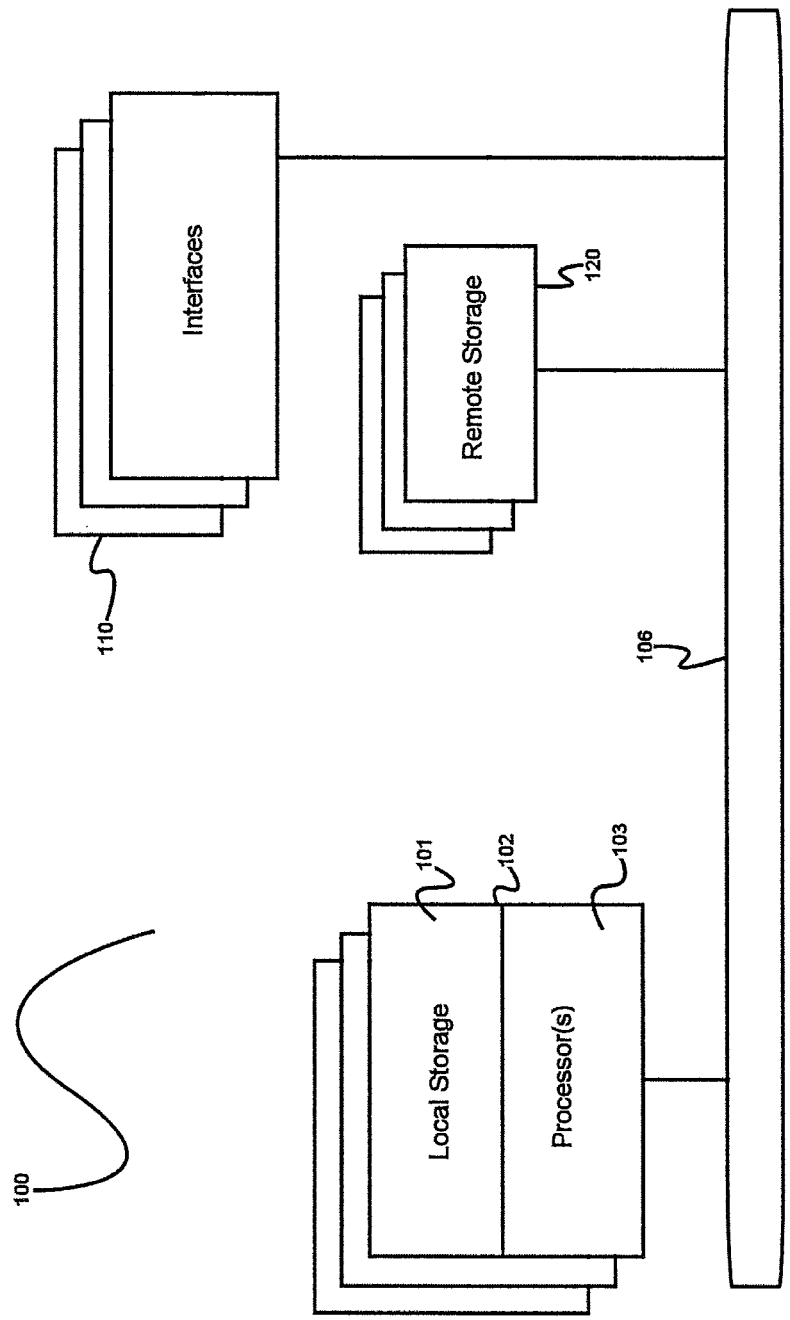
FIG. 1 is a block diagram illustrating an exemplary hardware architecture of a computing device used in an embodiment of the invention.

The inventor has conceived, and reduced to practice, a system and method for optimized and distributed routing of interactions. Systems deployed in accordance with one or more embodiments of the invention will generally be easily extensible to handle new interaction types and other activities such as work items or eLearning modules, that may require routing, and will be suitable for use in a wide range of deployment architectures, including particularly cloud-based routing architectures that manage routing of interactions for a large number of agents across a large number of enterprises.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

An "event" is a data representation of an instantaneous occurrence. For example, an event may be a data object or structure that comprises a set of data elements appropriate to describe an occurrence such as the arrival of a telephone call at a destination station. Such an event might include, for example, a time of arrival, a source of the call, an identity of the destination station at which the call arrived, an identity of the event as representing an occurrence of type of "call arrival", and possibly other fields such as an identity of the caller.

An "interaction" is a telephone call such as a plain old telephony service (POTS) communication, a voice over IP (VoIP) communication, an instant messaging (IM) or web chat communication, a video conference, a small messaging service (SMS) exchange, an email exchange, a social media exchange, a knowledge management collaboration, a speech or digit exchange with an interactive voice response (IVR) unit, or some other communication exchange between two or more people or processes or a combination thereof.

A "complex event processor" or a "complex event processing layer" is a component typically (but not necessarily) rendered in software that enables one to predict high-level results or occurrences (sometimes referred to as metaevents) likely to result from specific sets of low-level events. A complex event processor identifies and analyzes cause-and-effect relationships among events in real time, allowing it to proactively take or recommend effective actions in response to specific scenarios. Complex event processors generally operate by executing queries in a language similar to the well-known Structured Query Language (SQL), but adapted for handling streams of real time events, and these queries are executed against streams of events arriving at the complex event processor, generally from a plurality of event sources.

A "state machine" or a "state engine" is a component, either in software or in hardware (e.g., in a custom semiconductor device) that stores the state or status of one or more objects at a given time and that can operate on input (e.g., events) to change the state or status of one or more objects based on events or inputs received, and can also cause one or more actions or outputs to occur as a result of one or more state changes or events.

"Routing" is the process of identifying an appropriate target or resource to handle an interaction. For example, routing of inbound calls involves determining what agent is the best one to send a particular call to. Routing can also be performed on outbound interactions, or even on potential interactions (for example, a callback request can be routed to an appropriate agent, who then can place the call manually or automatically).

"Imperative demand" is when one or more interactions are classified such that it may be required that communication takes place when people, or systems, are connected at the same time. Typically, but not always, imperative demand is made up of real-time interactions. For example, telephone calls, instant messages, video conferences, or other similar interactions. In certain embodiment an interaction normally considered as imperative demand may be considered contingent demand.

"Contingent demand" is when one or more interactions are classified such that they may be handled immediately or a later time. Typically, but not always, contingent demand is made up of interactions where the participants do not communicate concurrently. For example, email communications, social media interactions, proactive web assistance through instant messaging, or other similar interactions where participants send, submit or post messages at different times. In certain embodiment an interaction normally considered as contingent demand may be considered imperative demand.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
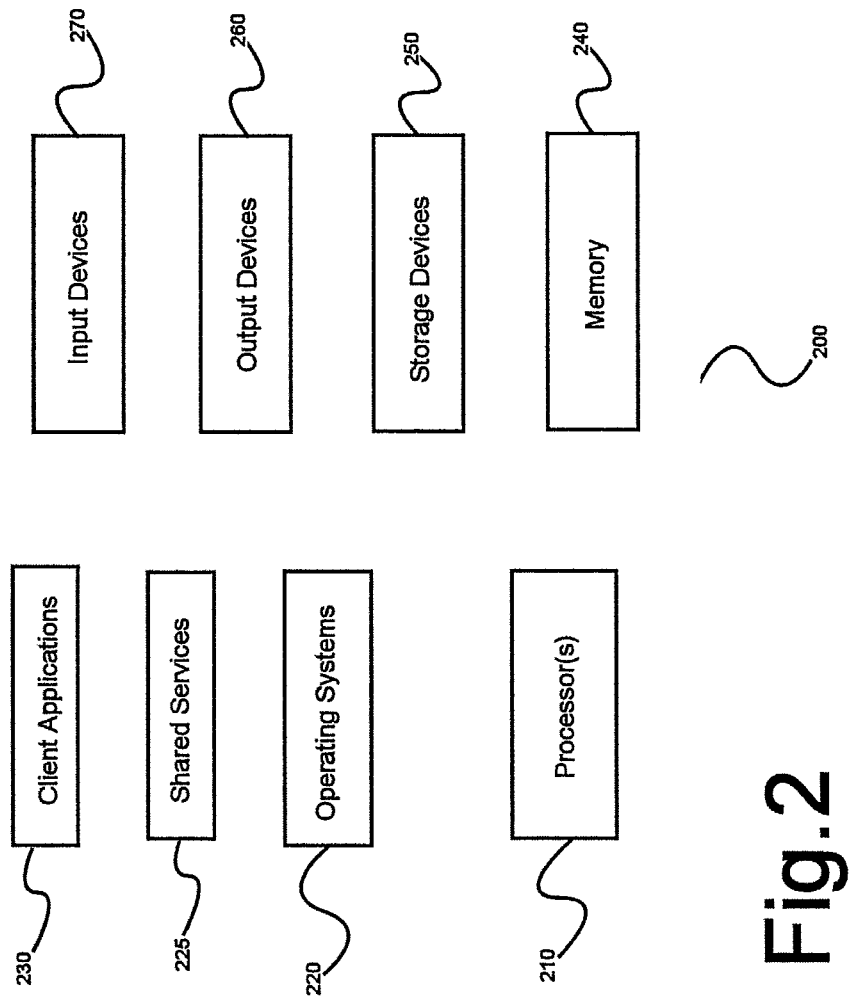
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
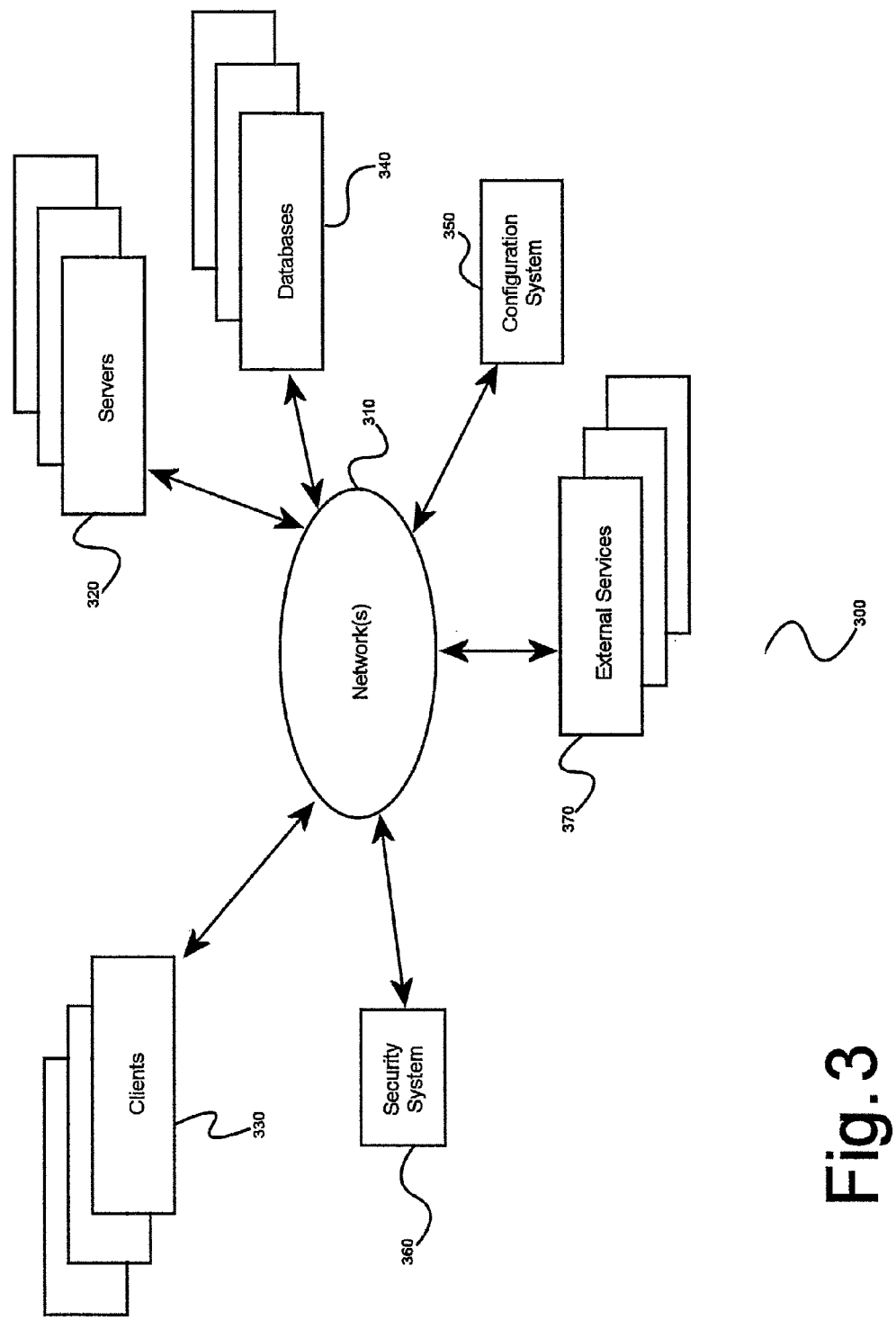
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Conceptual Architecture

Figure 4:
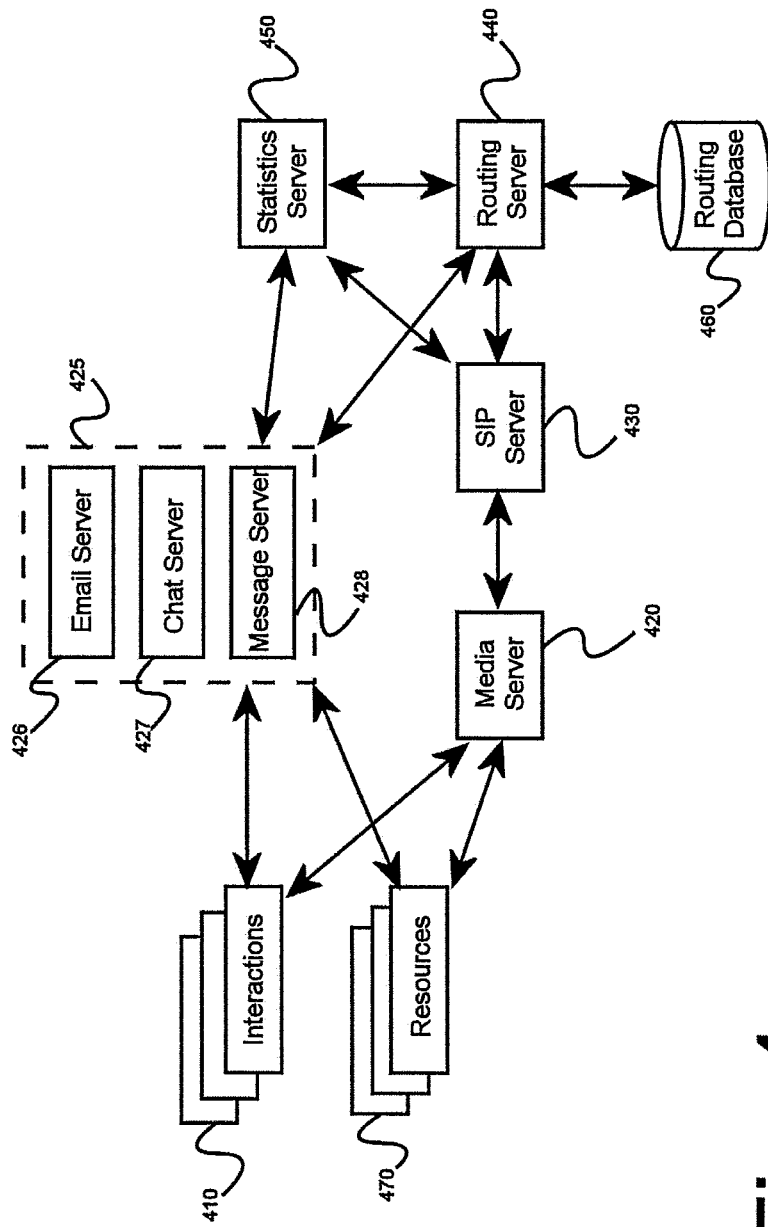
FIG. 4 is a block diagram of a conceptual architecture of a system according to a preferred embodiment of the invention.

FIG. 4 provides a high-level diagram of a preferred embodiment of the invention, which will be useful for discussing aspects of the invention and improvements inherent in the invention over systems known in the art. According to the embodiment, a plurality of interactions 410 are delivered to, or initiated outward from, media server 420. In some embodiments where a single medium (such as ordinary telephone calls) is used for interactions that require routing, media server 420 may be more specifically a private branch exchange (PBX), automated call distributor (ACD), or similar media-specific switching system. Generally, when interactions arrive at media server 420, a route request, or a variation of a route request (for example, a SIP invite message), is sent to session initiation protocol SIP server 430, or to an equivalent system such as a computer telephony integration (CTI) server 430. A route request is a data message sent from a media-handling device such as media server 420 to a signaling system such as SIP server 430, the message comprising a request for one or more target destinations to which to send (or route, or deliver) the specific interaction with regard to which the route request was sent. SIP server 430 or its equivalent may, in some embodiments, carry out any required routing logic itself, or it may forward the route request message to routing server 440. Routing server 440 executes, using statistical data from statistics server 450 and (at least optionally) data from routing database 460, a routing script in response to the route request message and sends a response to media server 420 directing it to route the interaction to a specific target resource. In a preferred embodiment, routing server 440 uses historical or real time information, or both, from statistics server 450, as well as configuration information (generally available from a distributed configuration system, not shown for convenience) and information from routing database 460. Statistics server 450 receives event notifications from media server 420 or SIP server 430 (or both) regarding events pertaining to a plurality of specific interactions handled by media server 420 or SIP server 430 (or both), and statistics server 450 computes one or more statistics for use in routing based on the received event notifications. Routing database 460 may of course be comprised of multiple distinct databases, either stored in one database management system or in separate database management systems. Examples of data that may normally be found in routing database 460 may include (but are not limited to): customer relationship management (CRM) data; data pertaining to one or more social networks (including, but not limited to network graphs capturing social relationships within relevant social networks, or media updates made by members of relevant social networks); skills data pertaining to a plurality of resources 470 (which may be human agents, automated software agents, interactive voice response scripts, and so forth); data extracted from third party data sources including cloud-based data sources such as CRM and other data from Salesforce.com, credit data from Experian, consumer data from data.com; or any other data that may be useful in making routing decisions. It will be appreciated by one having ordinary skill in the art that there are many means of data integration known in the art, any of which may be used to obtain data from premise-based, single machine-based, cloud-based, public or private data sources as needed, without departing from the scope of the invention. Using information obtained from one or more of statistics server 450, routing database 460, and any associated configuration systems, routing server 440 selects a routing target from among a plurality of available resources 470, and routing server 440 then instructs SIP server 430 to route the interaction in question to the selected resource 470, and SIP server 430 in turn directs media server 420 to establish an appropriate connection between interaction 410 and target resource 470. According to an embodiment, the routing script comprises at least the steps of generating a list of all possible routing targets for the interaction regardless of the real-time state of the routing targets using at least an interaction identifier and a plurality of data elements pertaining to the interaction, removing a subset of routing targets from the generated list based on the subset of routing targets being logged out to obtain a modified list, computing a plurality of fitness parameters for each routing target in the modified list, sorting the modified list based on one or more of the fitness parameters using a sorting rule to obtain a sorted target list, and using a target selection rule to consider a plurality of routing targets starting at the beginning of the sorted target list until a routing target is selected. It should be noted that interactions 410 are generally, but not necessarily, associated with human customers or users. Nevertheless, it should be understood that routing of other work or interaction types is possible, according to the present invention. For example, in some embodiments work items, such as loan applications that require processing, are extracted from a work item backlog or other source and routed by a routing server 440 to an appropriate human or automated resource to be handled.

DETAILED DESCRIPTION OF EXEMPLARY EMBODIMENTS

With this conceptual architecture of a contact center routing system 400 in mind, various embodiments of the invention, according to which enhanced routing capabilities are disclosed, will now be presented.

According to a preferred embodiment of the invention, for each route request received at routing server 440, a list of potential targets from among resources 470 is created immediately, without concern for the current state of the targets. This represents a distinct departure from the routing techniques known in the art (some examples of which were described in the background section), since normally routing systems in the art only consider targets for routing that are presently "logged in" (connected to system 400) and "ready" (in a state suitable for receiving a new call or interaction). When routing only considers such currently available agents, several problems present themselves. First, extra load and longer latency are incurred in prior art systems because every route request requires an active check of the current state of every potential routing target to which the interaction in question might be delivered. Second, when certain real-time states are needed in order to consider a target as suitable for routing, it is necessary to have a global state management system that has very low latency and that is very scalable (this is because, if states are not global or synchronized, and more than one routing server 440 is used in system 400, race conditions may exist where two or more routing servers 440 try essentially simultaneously to deliver interactions to a single target). Third, generally only a small number of resources 470 tends to be available to receive interactions at any given moment (otherwise, costs of running a contact center would be excessive), so it is usually impossible in systems known in the art to conduct global optimization computations (since routing server 440 will generally, according to the art, only consider interactions currently being routed). Thus, by generating a list, early in the routing process, that comprises all possible targets for a given interaction, without regard to the current state of those targets, it is possible to avoid these problems. Generation of such a list can be conducted in a highly parallel fashion, with lists being generated locally at a plurality of routing servers 440 that may comprise, for example, as many as hundreds of distinct instances of routing server 440. It will be recognized by one having ordinary skill in the art that any number of computations may be made, or business rules executed, to generate such lists, and any combination of such methods may be used according to the invention.

A target in the generated target list may be an identifier representing one or more contact center agent communication device (such as a plain old telephony service (POTS) telephone, a voice over IP (VoIP) end point, an instant messaging (IM) client application, a web chat client, a video conferencing application, a small messaging service (SMS)

server, email server, a knowledge management server, one or more interactive voice response (IVR) ports, one or more a route points (i.e. a special address within a telephone switch where calls are temporarily held pending action), one or more interaction queuing platform (for example, a voice treatment platform capable of delivering voice and/or music to an interaction in a waiting pattern), or one or more other destinations capable of serving an interaction automatically or with human interaction.

In one example, in a contact center environment system 400 where an interaction 410 is an incoming telephone call that may require a customer service interaction on a specific product, a target list may be generated to include a set of identifiers representing the locations of resources 470 that represent agents who are currently logged into system 400 with specific skills in customer service and who have knowledge in how to handle the specific product in question. The target list may also include a list of resources 470 that represent self-service IVR ports that may potentially allow the caller initiating interaction 410 to fulfill the request in an automated fashion without human intervention. Furthermore, the target list may also include geographically dispersed resources 470 that system 400 retrieved from, for example, a configuration database.

In another example, in a contact environment system 400, where an interaction 410 is an instant message requesting, for example, pricing information, a list of targets may be generated to include location identifiers for agent communication devices that are capable of instant message communications, knowledge management systems that are, for example, capable of automatically analyzing and replying to interaction 410, or other communication devices capable of communication with IM requests.

According to an embodiment, only targets eligible to satisfy a specific route request will be in any list of targets generated as part of handling the route request. Thus mandatory requirements for target eligibility, such as language requirements, minimum training requirements, licensing requirements, and the like, may be easily incorporated according to the invention.

Each target may be assigned one or more fitness parameters. A fitness parameter is a target attribute used to indicate how suitable a particular target (or class of targets) may be for receiving a specific interaction (or class of interactions), based on one or more requirements relevant to the interaction requiring service. Instead of simply selecting a target based on eligibility, a fitness parameter is an enhancement to a target description to deal with a wider variety of interaction requirements. For example, a target who speaks Spanish may be an eligible target, but a target whose Spanish attributes are that she is native speaker of the Spanish language indicates a level of language proficiency that may be more fit for a high-value interaction. Another example would a fitness parameter that corresponds to an efficiency score. An efficiency score can be based on how well a target has scored (for example, as a result of one or more customer surveys) in handling interactions of this type or when dealing with a customer who shares this demographic in past interactions. An efficiency score may also be calculated by how long it has been since the target has been on a break with the assumption being that the longer it has been since an target has been on a break, their efficiency may be reduced. An efficiency score may also be calculated based on how many times a target has recently performed a mental context switch or how long ago this context switch happened (that is, handling one type of interaction such as a call or an email, and then switching to another type of interaction. It can be appreciated by one having ordinary skills in the art that it requires mental energy to oscillate between two types of tasks that may potentially result in a reduction of efficiency). An efficiency score may also be calculated by taking into consideration behavioral patterns specific to a target, target group, or an entire communication center calculated in past interactions using one or more pattern recognition techniques known in the art.

Another example of fitness score may be a score indicating a likelihood of what the potential profit would be if interaction 410 was handled by a specific target. This could, for example, be determined by historical patterns on how the target handled one or more similar interactions, of the required type, in the past and what the associated performance metrics were on those interactions. In a similar example, a fitness score can be determined by calculating a cost that may be associated in handling interaction 410 by the target in question based on, for example, the commission, salary, or compensation of the target, or some other characteristic for the target handling an interaction of this type.

Another example of a fitness parameter may be an association to the types of interactions that a target may require as part of their training or fairness rules. For example, in order for a target to become proficient at handling a particular interaction type, a fitness parameter would be assigned to designate that target as temporarily capable of handling an interaction based on a situation where it would be prudent for a target to handle such an interaction, would be assigned. For example, the difficulty of interaction 410 may be above the capability of a target, but in order to train the target on difficult interaction, the target will be given the opportunity to handle interaction 410 for training purposes. Another example, interaction 410 is a high value interaction (e.g. one that could result in a high commission), and even though a target may not be the best choice to route interaction 410 to, with the idea of fairness, interaction 410 will be routed to a less-skilled target who may not have had many high-value interactions.

Each list may be sorted based on a primary fitness parameter (which may be changed at any time), or on some configured combination of fitness parameters. For example, a sorted list will be a list of eligible targets where the best possible resource (based on a selected "most important" attribute) may be listed in descending order. In another embodiment, more than one fitness parameter may be combined to generate a "composite fitness" parameter, which may be used to sort a target list. Based on target availability and other changes in system 400, for example data entered into an IVR, in some embodiments, a primary fitness parameter may be replaced by another attribute, for example, a specific product service combination as requested by the information collected from an IVR. Furthermore, a target list may or may not be sorted on multiple fitness parameters. For example, a primary sorted parameter may be how efficient the target will handle an interaction of a similar type as interaction 410. A second sorted fitness parameter may be the cost, in ascending order, for the target to handle interaction 410. Given the current operating environment, for example, the number of interactions waiting for a target, may result in a primary fitness parameter to change (i.e. another primary fitness parameter is selected instead). Fitness parameters may also change when, for example, there are not enough targets in the list based on a configuration set in system 400. In this case a different fitness parameter may be selected in an attempt to increase the size of the target list.

One or more lists of resources 470, whose resources may be used as targets for interaction routing, may be maintained by system 400. In some embodiments, information pertaining to a state or statistical characteristics of each target in lists 470 may be maintained by one or more statistics servers 450 or their equivalents. However, some embodiments of the invention may carry out routing processes without any global state or statistical information.

Once one or more lists of potential targets have been generated and sorted (herein, referred to as "target list"), routing engine 440 selects one or more targets for consideration as the ultimate routing target of an interaction. A target selector function uses one of several methods to pick a specific target to use for a particular interaction. For example:

A basic approach for target selection would be to select the first target in the list and send the call to the associated location. If the target is available to accept interaction 410 (that is, not currently occupied handling another interaction or being in some other unavailable state), then the target accepts (for example manually through some interaction to the communication device or integrated software process, or by some other means) to indicate that they will accept and handle interaction 410. The routing process is then complete. If the target is not available to handle interaction 410 (for example, the target is handling another interaction, the target may not be physically present at the communication station, the target is occupied performing other tasks, or the communication device is in a non-ready state for some other reason), then interaction 410 is returned to routing server 440 and the next target in the target list is selected. This procedure continues until a target that is available to handle interaction 410 is found. If, for example, all the targets in the list are not available, routing server 440 may designate one or more additional target, which may be a waiting queue, or some other interaction destination for further processing. In another example, routing server 440 may decide to reorganize the target list with a different set of fitness parameters, or encompass an expanded set of targets. Routing server may, in another example, may initiate another routing scenario described below.

In an advanced routing scenario, routing server 440 may select the first target and "offer" interaction 410 in a programmatic way to each target in the target list, in turn, until one accepts. For example, when interaction 410 requires routing, routing server 440 may send a message to the target and the target has the ability to accept the interaction, reject the interaction, or ignore the interaction through, for example, a software application on or associated to the communication device or through some other means. This approach would not require any availability state information for the target, since availability state information maintained locally to or by the target may be used as one factor in deciding whether to accept or reject an offer. If the target accepts interaction 410 then routing server 440 routes the interaction 410 to the appropriate communication device (for example, a plain old telephony service (POTS) telephone, a voice over IP (VoIP) end point, an instant messaging (IM) client application, a video conferencing application, a small messaging service (SMS) device, an email client, or some other communication device) associated to the target. Once the target accepts interaction 410, the interaction is routed, handled and the routing process is complete. If the target rejects or ignores the request, routing server 440 selects the next target in the list and the process begins again. In some embodiments, routing server may also modify a local availability state for the target based on whether the target accepted, rejected, or ignored the request. In other embodiments, routing server 440 may change the target list based on the success or failure of routing interaction 410.

In an optimized routing scenario, a global optimization engine is used to determine fitness of various combinations of target selections, to find optimal grouping. For example, in one embodiment, an optimized routing scenario may determine that interaction 410 is a low-value interaction. Value of an interaction may be determined, for example, by identifying what type of service the interaction required based on data collection in some part of the interaction (for example, service selection via an IVR) and determining, for example, the potential monetary value of associated to interaction 410. Since the optimized routing scenario has determined that interaction 410 may be a low-value interaction, routing server 440 may look past the first one or more targets that may, for example, be high value targets. In the case of a target list being sorted by the "best" target to handle the interaction (for example, as determined by the fitness scores) for the type of interaction of interaction 410, routing server 440 may want to reserve the best target to handle a more valuable interaction that may (or may not) arrive in the near future (for example, based on statistical probability). In this case, low-value interaction 410 would be handled by a lesser skilled target.

In another example, in an optimized routing scenario, routing server 440 may decide that in a situation where a statistical analysis calculating the average time it takes to handle an interactions in a recent period of time, showed that interactions were being handled longer than normal, that it may be best to handle interaction 410 by selecting a target that would handle interaction 410 in a more efficient manner in an attempt to reduce the average handle time for interactions in system 400.

In another example, in an optimized routing scenario, routing server 440 may decide that in a situation where there may be a reduced amount of demand for targets, interactions will be routed primarily to targets based on reduced cost. In this case routing server 440 may re-sort the target list to have a cost fitness parameter as the primary sorted fitness parameter and thus route interactions focused on reducing costs.

In another example, in an optimized routing scenario, routing server 440 may decide that in a situation where there may be a surplus of targets available to handle interactions, routing server 440 will route the interaction to a target where there would be a higher probability that customer satisfaction would be delivered in a more assured fashion, for example, based on a target's past performance in dealing with, for example, the demographic of the caller for interaction 410.

In another example, in an optimized routing scenario, routing server 440 may determine the value of interaction 410 by interfacing to publicly available information (for example, social networks) to find information about the person initiating interaction 410 to determine, for example, their level of influence by analyzing parameters such as twitter followers, number of comments on a blog, through social ranking services such as eCairn™ or Klout™, or through some other means. Routing server 440 may determine to sort or re-sort the fitness parameters based on gathered information through these sources.

According to an embodiment of the invention, in conditions of surplus imperative demand (that is, all possible targets in system 400 are currently in the process of handling interactions, and more interactions arrive requesting routing and thus there may be no targets available), when a target becomes available, routing server 440 initiates a selection process to analyze which interactions could be satisfied by the target, based on, for example, a comparison of the target's fitness parameters and the requirements of interaction 410, routing server 440 allocates an interaction to the available target. For example, a target that has expertise handling customer service queries for high net-worth individuals becomes available, routing server 440 will find an interaction representing a high net-worth individual and route that interaction to the available target.

In some embodiments, a similar mix of options for selection process could be used in conditions of resource 470 surplus. A resource surplus is where there are a high number of targets available to handle interactions. For example, many targets are not currently handling interactions and available and waiting for an interaction. When interaction 410 arrives in system 400 and requests routing instructions from routing server 440, routing server 440 will create a reduced target list and begin offering interactions to the best fit targets in system 400.

According to an embodiment of the invention, contingent demand (that is, interactions that do not require the immediate attention of a resource such as email interactions, social media interactions, outbound interactions, SMS interactions, and the like. Typically contingent interactions are asynchronous interactions that do not require a real-time or an immediate response by a contact center resource, though this may not always be the case) can be handled using system 400. Some quantity of contingent demand requests is kept in system (could be all of them or a fixed percentage, or all those needing service within a specified time, or a fixed number of them, with the specific requests being selected by one or more rules). Each contingent demand request has its own target list with associated fitness scores, as with imperative demand. In general, there should be a target-rich environment when using contingent demand. In an exemplary situation when there may be a surplus of resources, idle resources (that is, resources that may not currently be occupied in handling telephone interaction or some other type of imperative task), or resources who are performing a task that is deemed non-imperative may be offered, assigned, or be notified that there may be one or more contingent interactions that may be handled during their idle time.

In an embodiment of the invention, an optional "work pull" feature is provided, allowing resources 470 to view a list of available contingent or imperative demand requests that require service, and to then to be able to select a request to satisfy from the list. In some embodiments, such a work pull feature may be limited it to certain resources 470, such as for example based on seniority, job role, or job performance.

Potential "special features", according to various embodiments of the invention, may comprise "work type hysteresis" (avoiding context switching penalties by allowing work mode switches only every so often), or the notion of "fairness scores" in target lists to meet labor rules.

Systems 400 according to the various embodiments of the invention will typically provide several useful advantages to operators of single-enterprise, multi-tenant, premise-based, or cloud-based contact centers. One such advantage is that routing in accordance with embodiments of the invention is easy to build and use. Another is that the simple approach of the invention is amenable to one or more highly scalable architectures, since it does not depend on global state information and features highly decentralized (and parallelizable) decision-making. Furthermore, target fitness computations can be performed anywhere, and may be cached in one or more locations, to further support highly distributed architectures and decision-making.

According to the invention, optimization can be performed in a distributed way, yet still deliver overall global optimization. Nevertheless, it is encrypted by the inventor that various embodiments of the invention will be able to support either centralized or decentralized decision-making styles, or a blend of the two styles.

Various embodiments of the invention support worker enablement strategies (workers can make local decisions without changing architecture). For example, in an embodiment, workers may be given flexibility as to when workers may arrive to start their work shift, when workers may leave at the end of their work shift, or workers being able to generally decide when to take breaks. Since router 440 is able to access additional targets form a wider pool of resources, in a situation where there may be an increase in imperative demand, workers can arrive early or late for their work shift or be on a break as the system may have enough resources to handle demand.

Routing systems according to the invention may handle outbound as well as inbound interactions and workflow processes within a single routing environment.

System 400 in general relies on various media servers 410 to handle media-specific details, so routing servers 440 can function in a highly diverse media channel environment. For example, in one embodiment an email server would act as a media server 410 and handle email-specific interaction details, and routing servers 440 would need only use specific attributes of an interaction (likely including the fact that the interaction is an email) to select a specific target to which the interaction should be delivered. Once a target is selected, a routing server 440 would need only inform media server 410 (that is, the email server) of the desired target, and media server 410 would carry out email-specific actions required to deliver the interaction to the specified target.

The discussion of FIG. 4 to this point has focused on telephonic interactions, which remain a major component of the traffic of contact centers despite the introduction of numerous new interaction channels (or media types) such as emails, instant messages, chat sessions, short messaging system (SMS) messages, social media interactions, and so forth. It is important to note that the telephonic examples are merely that—exemplary. The inventor envisions use of optimized routing systems according to the present invention to route all kinds of interactions as well as activities such as work items, eLearning modules, and the like. For example (and these are merely more examples, and should not be construed as limiting), in some cases and according to the preferred embodiment illustrated in FIG. 4, interactions 430 may be handled by specialized media servers that handle particular interaction or activity types or specific media types, rather than by a general-purpose media server such as media server 420. Specific examples of specialized media servers 425 may include an email server 426, which receives email interactions 410, sends information pertaining to email-related events to statistics server 450, and sends route requests to (and receives responses and routing directions from) routing server 440, whereupon email interactions 430 are routed to one or more resources 470. Similarly, chat server 427 may manage chat or instant message interactions 410, and message server 428 may manage generic message-type interactions 430 such as Twitter™ or Facebook™ posts, using functions or capabilities of statistics server 450 and routing server 440 as needed to route the applicable interaction types to one or more resources 470. Thus it should be evident that additional specialized or general purpose servers or other modules may be used in accordance with the invention (and in conjunction with routing server 440 and possibly statistics server 450 to route interactions 410 or activities such as work items or eLearning modules (not shown).

Figure 5:
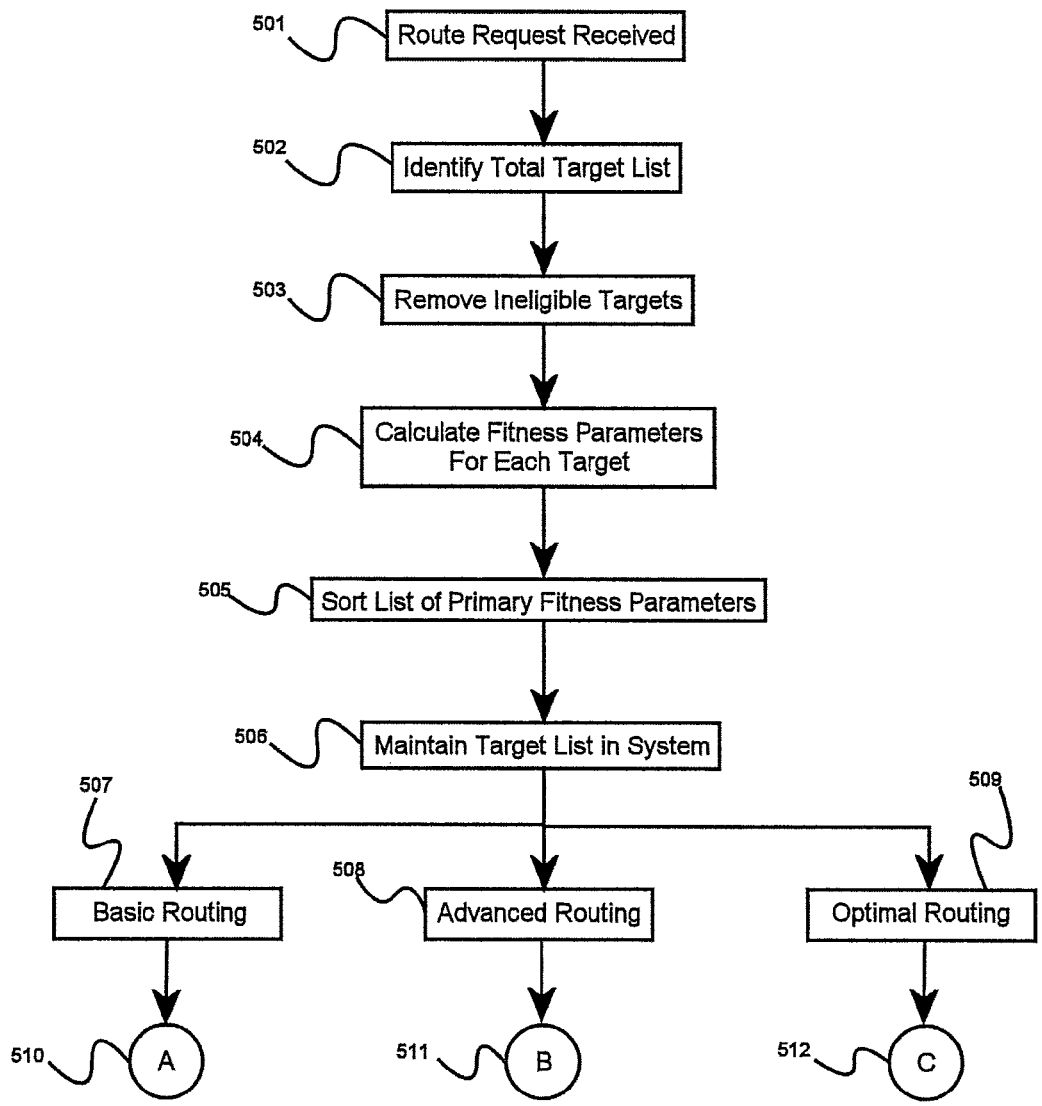
FIG. 5 is a process flow diagram illustrating a method for setting up a target list for interaction routing, according to a preferred embodiment of the invention.

FIG. 5 is a process flow diagram illustrating a method for setting up a target list for interaction routing, according to a preferred embodiment of the invention. In step 501 a route request (that is, a signal that an interaction requires processing via a connection to an automated or human resource for the purpose of handling product or service requests) is received by SIP server 430 from media server 420 indicating that interaction 410 has arrived and needs to be routed. In step 502, SIP server 430 then sends a request to routing server 440 to determine a list of targets (herein referred to as "target list") to which interaction 410 can be sent.

In step 503, all ineligible targets are removed from the target list based on any available characteristic information retrieved about the interaction. Information about the interaction can be retrieved from a number of sources including, but not limited to, a configuration database holding attribute information about interaction 410. For example, in a communication center environment, interaction 410 can be a caller with a particular phone number or account number that corresponds to a customer profile, having associated information indicating characteristics such as language preference, account types, etc. Information about the interaction can also be retrieved by data that may accompany or be attached to the interaction (for example, data collected through an interactive voice response (IVR) unit, not shown) or through connections to publicly available information such as social profiles on social networks (for example Facebook, Twitter, LinkedIn, etc.), social ranking sites (for example, eCairn™, Klout™, etc.) or other information, or a combination of all of these. A target may be deemed ineligible if it is, for example, incapable of serving the interaction (for example, the interaction must be handled in a particular language and the target does not have the required language skill). In an embodiment, step 502 and 503 may happen simultaneously by, for example, accessing a database that returns all eligible targets. In this case, the list will already have ineligible targets removed.

In step 504, a fitness parameter is calculated. A fitness parameter is an attribute of the target that may be used to determine how suitable a target may be based on the requirements of an interaction requiring service. Once a target is deemed eligible, a fitness parameter enhances the target selection process. The fitness parameter acts as an indicator to signify how proficiently a target may be able to handle interaction 410. For example, if interaction 410 is a social media interaction (e.g. a negative comment that someone has posted on a public network such as the company's Facebook page, or the like), the fitness parameter may correspond to a target that may have good social media writing skills combined with previous experience with commenting on Facebook. In another embodiment, where interaction 410 is an angry individual, as determined by, for example, an automated mood detection process known in the art, a fitness parameter may indicate the proficiency of a target's ability in handling conflict situations.

In step 505, targets are sorted based on a primary fitness parameter, that is, a parameter that is deemed important to the handling of the particular interaction (for example, proficiency in certain application platform such as social media mentioned previously). Though this may not always be the case. Furthermore, a target list may or may not be sorted on multiple fitness parameters (for example, the primary sorted parameter may be language and the secondary sorted parameter may be level of training in a certain area of service).

In one embodiment, system 400 will perform a basic routing process of interaction 410 in step 507 and the process continues in step 510. In another embodiment, system 400 will perform an advanced routing process in step 508 and the process continues in step 511. In yet another embodiment, system 400 will perform an optimal routing process in step 509 and the process continues in step 512. In yet another embodiment, system 400 will choose one or more routing processes (for example, a basic routing process in step 507, an advanced routing process in step 508, an optimal routing process in step 509, or a combination of one or more routing processes) based on environmental conditions, dynamic triggers, thresholds, or some other information For example, if system 400 is part of a multi-site system and under heavy load, system 400 may decide to use only a basic routing process in step 507 to not add additional load to the multi-site system, or in another example, system 400 could not find a successful target using a basic routing scenario in step 507 and decides to use an optimal routing process in step 509, to find a target in another system 400, or some other combination of routing processes.

Figure 6:
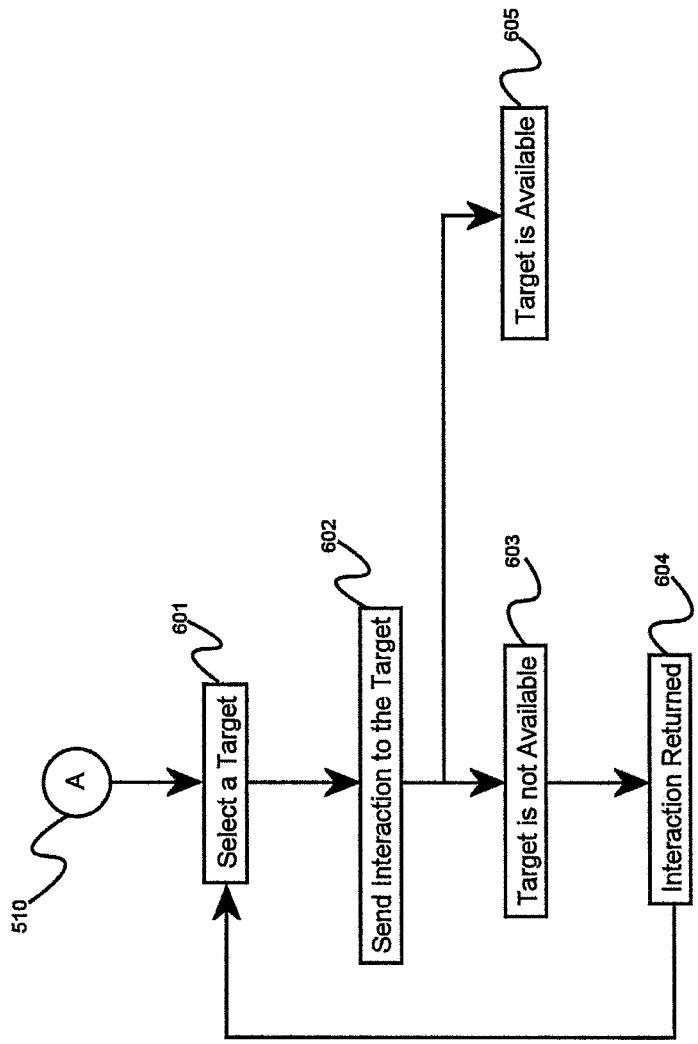
FIG. 6 is a process flow diagram illustrating a method for basic routing of an interaction to a target, according to a preferred embodiment of the invention.
Figure 7:
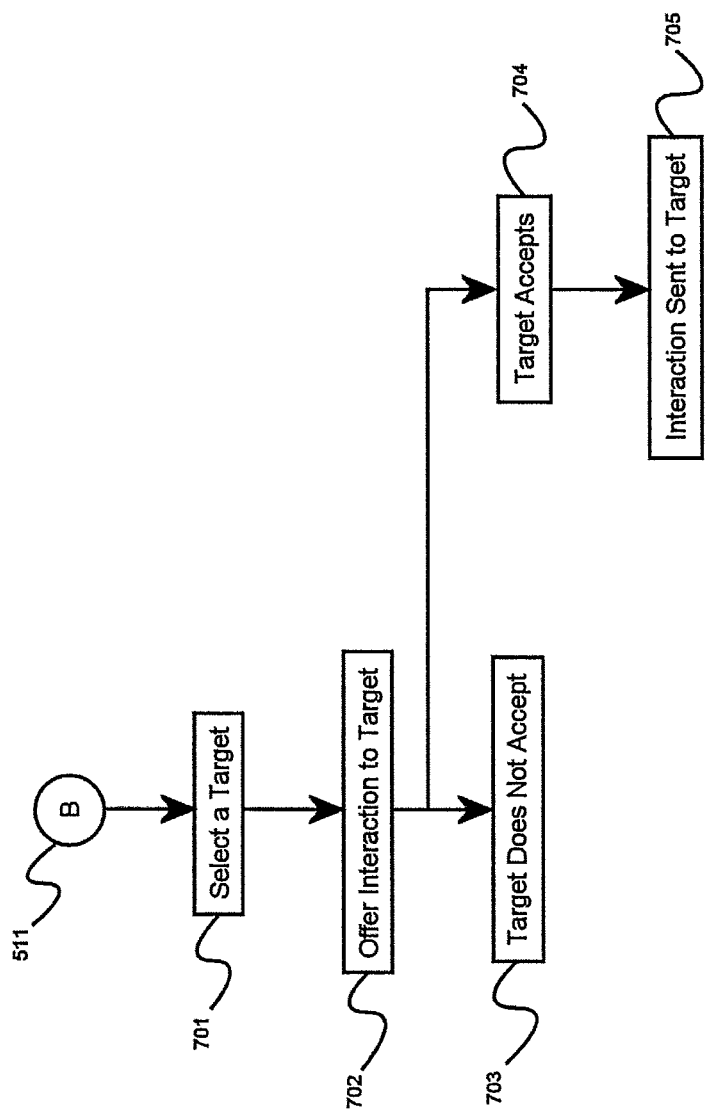
FIG. 7 is a process flow diagram illustrating a method for advanced routing of an interaction to a target, according to a preferred embodiment of the invention.
Figure 8:
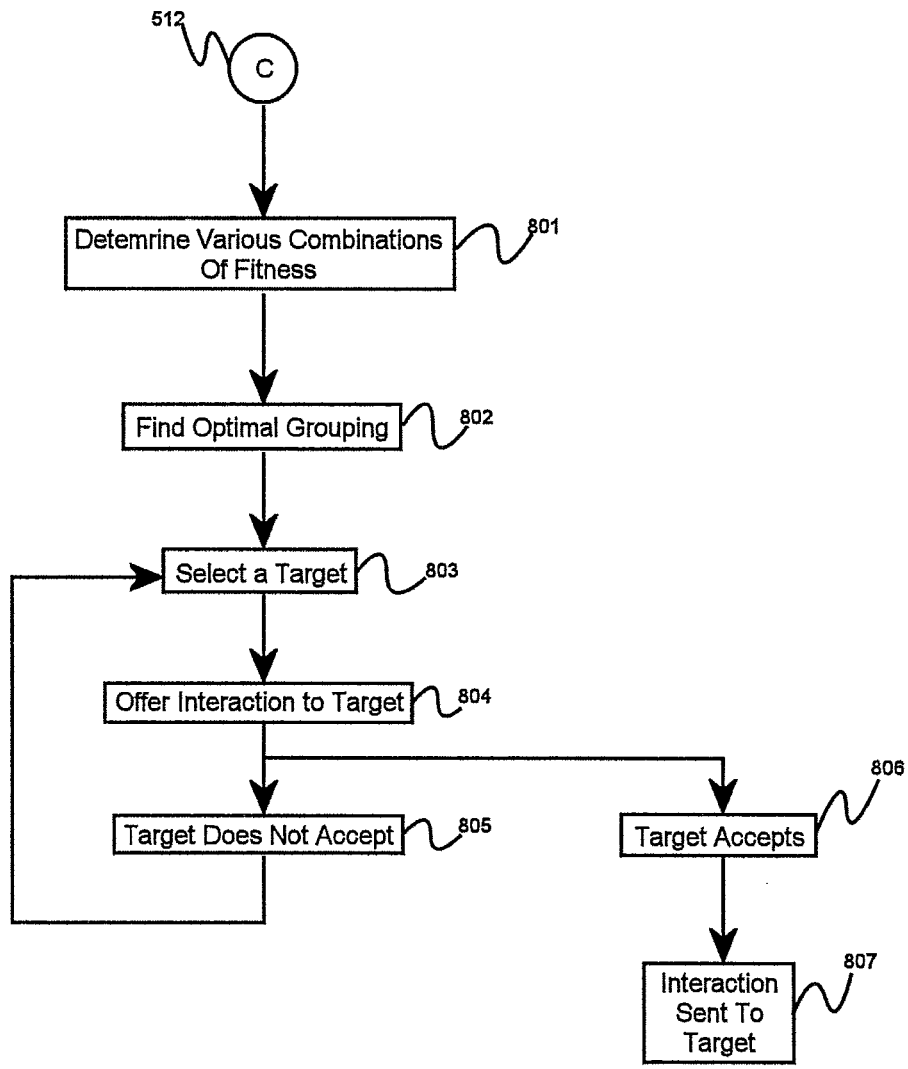
FIG. 8 is a process flow diagram illustrating a method for optimal routing of an interaction to a target, according to a preferred embodiment of the invention.

In the processes illustrated in FIGS. 6-8, examples are given in which one from among a plurality of available targets is selected (the distinction between the three processes being how a particular target is selected). This is for clarity of illustration of three exemplary means of target selection once a ranked target list has been selected (including, in the case of the method described with reference to FIG. 8, possibly first adding or dropping targets from the list generated in step 506 and even reordering or re-ranking targets under direction of an optimizer process 903. However, it should be noted that system 400 also may be required to route interactions 410 or activities during periods when, rather than a target surplus, a target deficit exists (or conversely, an interaction surplus exists). Furthermore, it is certainly possible, as will be appreciated by one having ordinary skill in the art, that conditions of interaction surplus and of resource (target) surplus may both exist (typically when certain interaction types are in one state while others are in the opposite state). In general, the processes outlined herein with respect to FIGS. 5-8 apply equally well to both situations. During periods of interaction 410 surplus, it may be necessary for interactions 410 with characteristics of imperative demand (that is, interactions 410 such as telephone calls that require—imperatively—some action to be taken right away, since to do otherwise could result in a customer hearing a busy tone or endless ring tone) to provide some form of intervening treatment as is well-known in the art (for example, by playing music on hold, or by sending a call to a voice response unit to obtain additional data from a customer or to enable some amount of self-service, or to offer a callback at a later time to the customer, who upon accepting such an offer could hang up and await the callback). In general, routing scripts specify what actions to take (e.g., what treatments to apply) when an imperative demand interaction 410 cannot be immediately routed to an available resource 470 (note that contingent demand interactions 410, such as emails, can often be simply suspended, added to a backlog list, or resubmitted at a later time without applying a treatment, since the other party is not expecting an immediate response for contingent demand interaction 410 types). One particular aspect that must be specified either in a routing script or in a default configuration rule is how to select, when a resource 470 becomes available and there are several or even many interactions 410 available that could be sent to the resource 470 in question, which interaction 410 is selected for delivery to the newly-available resource 410. Many approaches to this problem are known in the art, such as delivering the longest-waiting or highest-priority interaction 410 to the resource 470, and any of these may be used according to the invention.

FIG. 6 is a process flow diagram illustrating a method for basic routing of an interaction to a target, according to a preferred embodiment of the invention. In step 601 a target is selected from the beginning of the target list obtained in step 510. Interaction 410 is then sent to the target's corresponding location (for example, in a communication center environment, a telephone set, or other communication device) in step 602. If the target is available, interaction 410 is processed by the target in a typical fashion for the particular environment (for example, in a communication center environment, a voice, video, or textual conversation). If the target is not available, interaction 410 is returned to routing server 440 in step 604 and the next target is selected in step 601. This process continues at step 601 until a target is available.

FIG. 7 is a process flow diagram illustrating a method for advanced routing of an interaction to a target, according to a preferred embodiment of the invention. In step 701 a target is selected from the beginning of the target list from step 511. Routing server 440 then offers interaction 410 to the target in step 702. If the target accepts in step 704, interaction 410 is sent to the target and interaction 410 is processed by the target in a typical fashion for the particular environment (for example, in a communication center environment, a voice, video, or textual conversation). If the target does not accept in step 703, then a new target is selected in step 701, and the process continues at step 701 until a target accepts interaction 410. In this case, the target has the ability to accept the interaction, reject the interaction, or ignore the interaction through, for example, a software application on or associated to the communication device or through some other means. In step 703, the target may be deemed to have not accepted the interaction if, for example, a timeout occurs because, for example, the target was not physically present or not able to interface with the communication device or the associated software process that enables the target accept or reject the interaction, routing server 440 may modify and keep the state of the target to avoid, for example, offering future interactions. In some embodiments, if a sorted target list is empty after a routing target declined to accept and interaction, a target unavailable script may be executed in an interpreter server for the interaction.

FIG. 8 is a process flow diagram illustrating a method for optimal routing of an interaction to a target, according to a preferred embodiment of the invention. In step 801, optimization engine 903 uses a target list from step 512 to determine various target lists based on different combinations of fitness. For example, optimization engine 903 uses targets from one or more sites, across one or more geographies, across one or more business groups, across one or more business entities, or other information that can be used to optimize a target list. Optimization is accomplished by determining the best and most effective way possible to route interactions given the current conditions (for example, target availability, current traffic patterns of interaction, or some other known or predicted condition) and requirements (for example, business rules, training requirements, license requirement, or some other known or predicted requirement) in a communication environment. For example, in a situation where interaction 410 who may be a calling about a complaint requires a target. In a system where there may currently many idle targets, an optimized target list may be determined by optimization process 905 calculating a fitness score where targets are sorted by which target may cost less (for example, as determined by their salary, commission or some other cost information) to handle the interaction. Since, in this example, the caller has indicated through, for example, and interactive voice response (IVR) system that they are calling about a complaint, fitness combination engine 904 may further define the fitness score by identifying targets that are known to provide good customer service. Fitness combination engine 904 combines these fitness scores into a composite fitness score. Optimization engine 903 may decide to rank based on the composite fitness score or sort by only one of the elements, or some other combination. In another embodiment, optimization may be accomplished by utilizing predicative elements to calculate fitness scores. For example, for interaction 410, optimization process 905 may calculate the likely profit from such an interaction. If the likely profit passes some pre-defined threshold, optimization engine 903 may decide to sort primarily on targets that are capable of handling high-value interactions. Alternatively, if the likely profit dies not surpass a pre-defined threshold, optimization engine 903 may decide to sort the target lists by, for example, lowest cost targets or targets in a training capacity. Once optimization engine 903 has determined one or more target lists representing various combinations of fitness parameters, in step 802, optimization engine 903 computes one or more groupings that are optimal (herein referred to "optimal target list"). In step 803 a target is selected from the optimal target list. In step 804, routing server 440 then offers interaction 410 to the target. If the target accepts in step 806, interaction 410 is sent to the communication device that corresponds to the target in step 807 and interaction 410 is processed by the target in a typical fashion for the particular environment (for example, in a communication center environment, a voice, video, or textual conversation). In step 805, if the target does not accept (for example, target is not available, target is occupied, target ignores the request, or target is not able to accept for some other reason) then a new target is selected in step 803, and the process continues in the same fashion until a target accepts interaction 410. In some embodiments, if a sorted target list is empty after a routing target declined to accept and interaction, a target unavailable script may be executed in an interpreter server for the interaction.

Figure 9:
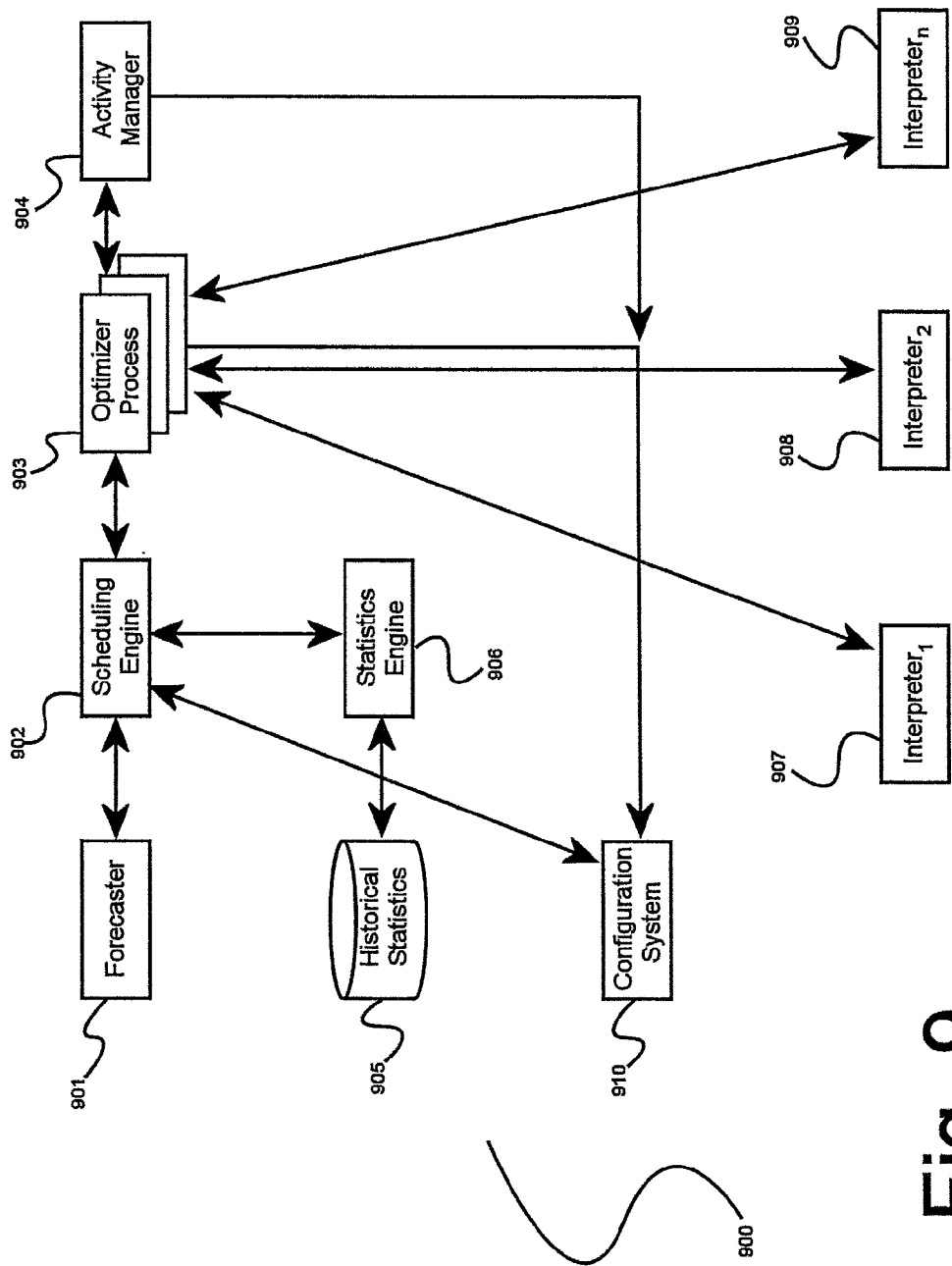
FIG. 9 is a block diagram showing details of a global optimization component for optimal routing, according to a preferred embodiment of the invention.

FIG. 9 is a block diagram showing details of a global optimization component for optimal routing, according to a preferred embodiment of the invention. Forecast engine 901 creates a forecast of imperative demand (for example, telephone interactions, video conferencing interactions, instant messaging interaction, or other interactions requesting a resource), and contingent demand (for example, email interactions, outbound interactions, short message service (SMS), or other interactions that can be treated as backlog). Forecast engine 901 starts by combining imperative demand and contingent demand in a way that suggests an approximate number of resources required to handle the combined demand by allocating resources based on an estimate of imperative and contingent demand. If imperative demand is higher than forecast then forecast engine 901 may, for example, shift resources' activities, reschedule breaks, modify minimum time rules, etc. to enable additional resources to handle imperative demand. Scheduling engine 902 creates an approximate schedule for a period of time for resources to be available to handle interaction in system 900. For example, in one embodiment, scheduling engine 902 may generate a long-range schedule may include the shifts for resources based on historical information from various data sources including, but not limited to, information generated by statistics engine 906 using data from historical statistics 905, configurations system 910, external data (not shown), or other information sources. In another embodiment, scheduling engine 902 may create a mesoscale schedule, that is a schedule based on time increments that are intermediate between long-range time scales (for example, weekly, monthly, or quarterly schedules) and short-range time scales (typically minute-by-minute), and on a coarse level of granularity of detail (for example, by creating a schedule that provides a rough estimate of overall staffing adequate to handle all forecasted imperative demand and substantially all of the forecasted contingent demand, which nevertheless does not need to be scheduled precisely, for the reason that the timing of contingent demand is somewhat controllable and therefore contingent on other factors). An example of a mesoscale schedule is one where the schedule is forecasted on an hour-by-hour basis, and where "chunks" of employee types are scheduled rather than individual employees. In some embodiments, scheduling engine 902 not only determines resource scheduling, but may also outline various activities that resources will perform during different times in the schedule. For example, a schedule may outline that a resource, for example, a contact center agent, would start her shift at approximately 8:00 AM and finish at approximately 5:00 PM (generally a goal of mesoscale forecasting and scheduling is that actual detailed employee schedules are not intended to be rigid, and so start and stop times can be treated as approximate, which is a departure from the art). The schedule may further include information on what activities are to be performed by the resource during the shift. In another embodiment, the schedule may further define how often a resource may shift activities. For example, a resource may handle incoming calls (i.e. imperative demand) for one hour then shift tasks to handle emails (i.e. contingent demand) for another hour, and then shift back to incoming calls. In some cases, a resource's activities may change depending on circumstances with respect to imperative versus contingent demand currently present in system 900.

Activity manager 904 determines which activities resources should perform given current and historical statistics as received from statistics engine 906, from configuration engine 910, or from other data sources (not shown). One goal of activity manager 904 is to ensure that resources are allowed to focus on one activity at a time, switching only periodically as required, rather than on an interaction-by-interaction basis as has been done previously in the art. For example, configuration setting might be established (based for example on data analysis pertaining to fatigue and context-switching effects on workers), resources may be required to work on particular activities for at least, for example, thirty minutes, to minimize any inefficiency created by a context switch. Activity manger 904 may also determine parameters regarding which specific activities particular resources will work on based on fairness rules, legal requirements, licensing requirements, union agreements, training requirements, or some other constraint that may require an activity to be limited or extended for particular resources (or classes of resources).

Interpreters 907-909 typically receive an interaction and invoke a script (for example, a script written in CCXML, VoiceXML, a proprietary scripting language, or some other scripting language such as Python, Perl, PHP, Ruby, Groovy, and the like) to handle the interaction. In one embodiment, if an interaction that arrives at interpreter 907 is a voice interaction, interpreter 907 may invoke a CCXML script to manipulate the routing of the voice interaction. It will be appreciated by one having ordinary skill in the art that CCXML scripts may control how telephone calls are placed, answered, transferred, conferenced, and more. In another embodiment, if an interaction that arrives at interpreter 908 is a voice interaction, interpreter 908 may invoke a VoiceXML script to perform an automated dialog with the caller (for example, to identify or segment the caller, or to offer self-service, or for some other means). In some embodiments, interpreter 909 may act as a time-division multiplexing (TDM) to voice over IP (VOIP) converter to enable connection of system 900 to public switched telephone networks (PSTN), integrated services digital networks (ISDN), private branch exchange (PBX) systems, or other similar networks.

Optimizer processes 903 optimize perform various optimization computations to assist in achieving regional, global, or other optimizations of system performance, for example by adjusting one or more target lists generated locally based on local requirements in order to optimize global or regional interaction distribution effects. In an embodiment, optimizer process 903 requests data from statistics engine 906 to calculate statistics for, for example, fifteen-minute time intervals. Optimization process 903 uses statistics (for example, how many interactions were received within a specified period of time, how many calls are currently waiting in the system, how many agents are currently waiting for interactions, or some other metric) to help determine how best to handle imperative and contingent demand, to optimize how system 900 will behave. In another embodiment, optimization process 903 may use, for example, environmental information, such as the latency, between a plurality of components within, or external to, system 900. For example, for other systems 900 whose latency is greater than a certain threshold, those systems, for example, may be ignored and not used in optimization. For example, a number of interpreters 907 register to optimizer process 903. If, for example, a data latency measurement between optimizer 903 and a subset of interpreters 907 is found to exceed some specified threshold, optimizer process 903 might deregister interpreters 907 whose latency was excessive.

Optimizer process 903 may optimize the behavior of various components in system 900. For example, optimizer process 903 may request a list of all the agents with associated fitness scores who can handle, for example, a particular interaction. In this example, there may be, for example, fifteen resources that are able to handle the interaction, but three of them, however, may be showing signs of fatigue, or, in another embodiment, six resources are about to be shifted to a new activity, or a global fairness rule will be applied. Optimizer process 903 may re-order the fitness scores based on this information.

In some embodiments, a plurality of statistics servers 450 or statistics engines 906 (which are functionally equivalent) may be used, rather than a single such server, to enhance robustness and scalability of the functions carried out by the plurality of statistics servers 450, 906. In some embodiments, each statistics server 450 may be configured to compute statistics related to objects and aggregates of objects in a specific geographic, network, or other subdomain, and routing servers 440 and interpreters 907-909 may use statistics from a plurality of statistics servers 450 to make routing decisions. For example, in some embodiments, specific statistics servers 450 may monitor events coming from any media servers 420, router servers 440, or interpreters 907-909 whose events are received at the specific statistics servers 450 with a latency of less than some threshold time (that is, if events from a specific media server 420 arrive at a specific statistics server 450 with a latency that exceeds a threshold, then events from that media server 420 would be ignored by the specific statistics server 450). This approach allows for robust scaling without requiring extensive configuration (which must generally be maintained, making such systems brittle to changing in underlying network dynamics).

In another embodiment where a resource is, for example, working on a pre-defined schedule, the resource's activities may be modified dynamically based on current or predicted conditions (for example, statistics engine 906 sends a notification that there is an increasing trend in imperative demand). In this case, a resource that was working on a contingent demand item, such as an email interaction, may have a shift in activity to begin handling inbound voice interactions.

In another embodiment, a plurality of optimization engines 903 exchange a thermodynamic variable (that is, "hot" may indicate that there is a high level of imperative demand traffic, "cold" may indicate that there is a low level of imperative demand traffic) indicating how able they are to handle interactions. If one optimization engine 903 is part of a system 900 that is, for example, currently heavily overloaded (i.e. "hot" temperature), and another optimization engine 903 whose respective system 900 is currently under loaded (i.e. "cold" temperature), optimization engine 903 may decide to shift imperative demand to the system 900 that is under loaded.

What is claimed is:

1. A system for optimized and distributed routing of synchronous interactions, the system comprising:
   a plurality of media servers stored and operating on network-attached computers, each adapted to handle synchronous interactions of one or more specific media types drawn from a list comprising: analog telephone calls, digital telephone calls, video calls, or instant messaging or web chat sessions;
   a statistics server stored and operating on a network-attached computer and coupled to the plurality of media servers;
   a routing database stored and operating on a network-attached computer and accessible via a network; and
   a routing server stored and operating on a network-attached computer;
   wherein upon receiving or initiating a synchronous interaction of a specific media type drawn from the list, a first media server from the plurality of media servers sends a route request message comprising at least an interaction identifier and a collection of interaction-specific data to the routing server;
   further wherein the statistics server receives event notifications from the plurality of media servers regarding events pertaining to a plurality of specific interactions handled by the plurality of media servers, and the statistics server computes one or more statistics for use in routing based on the received event notifications;
   wherein the routing server executes, using statistical data from the statistics server and data from the routing database, a routing script in response to the route request message and sends a response to the first media server directing it to route the interaction to a specific target resource; and
   wherein the routing script comprises at least the steps of generating a list of all possible routing targets capable of handling the synchronous interaction regardless of the real-time state of readiness to receive a synchronous interaction of the routing targets using at least an interaction identifier and a plurality of data elements pertaining to the synchronous interaction, computing a plurality of fitness parameters for each routing target in the generated list, sorting the generated list based on one or more of the fitness parameters using a sorting rule to obtain a sorted target list, and using a target selection rule to consider a plurality of routing targets starting at the beginning of the sorted target list until a routing target is selected.

2. A method for optimized and distributed routing of synchronous interactions, the method comprising the steps of:
   (a) receiving or initiating a synchronous interaction of a media type drawn from a list comprising: analog telephone calls, digital telephone calls, video calls, or instant messaging or web chat sessions at an interpreter server operating on a network-attached computer;
   (b) generating a list of all possible routing targets for the synchronous interaction based regardless of the real-time state of readiness to receive a synchronous interaction of the routing targets capable of handling the synchronous interaction using at least an interaction identifier and a plurality of data elements pertaining to the interaction;
   (c) computing a plurality of fitness parameters for each routing target in the generated list;
   (d) sorting the generated list based on one or more of the fitness parameters using a sorting rule to obtain a sorted target list;
   (e) using a target selection rule to consider a plurality of routing targets starting at the beginning of the sorted target list until a routing target is selected; and
   (f) routing the synchronous interaction to the selected routing target.

3. The method of claim 2, wherein the target selection rule comprises the steps of:
   (e1) sending the synchronous interaction to the highest untested routing target in the sorted list;
   (e2) if the routing target to which the synchronous interaction was sent does not respond to the synchronous interaction, returning the synchronous interaction to the interpreter server;
   (e3) dropping the routing target that did not respond from the sorted list; and
   (e4) returning to step (e1) unless the sorted list is empty.

4. The method of claim 2, wherein the target selection rule comprises the steps of:
   (e1) offering the synchronous interaction to the highest untested routing target in the sorted list;
   (e2) if the routing target to which the synchronous interaction was offered does not respond to the offer or declines the offer, dropping the non-responsive routing target from the sorted list and returning to step (e1);
   (e3) if the routing target to which the synchronous interaction was offered accepts the offer, selecting the accepting routing target as the final routing target for the synchronous interaction and proceeding to step (f);
   (e4) if the sorted list is empty and no routing target was selected, executing a target unavailable script in the interpreter server for the synchronous interaction.

5. The method of claim 3, wherein the target selection rule comprises the steps of:
   (e1) determining a plurality of combined fitness scores;
   (e2) determining an optimal grouping of potential routing targets by an optimization server executing on a network-attached computer, using one or more optimization algorithms to determine a global optimum, a regional optimum, or a local optimum grouping based on a current or expected population of interactions requiring routing, thereby generating an optimal target list;
   (e3) offering the synchronous interaction to the highest untested routing target in the optimal list;
   (e4) if the routing target to which the synchronous interaction was offered does not respond to the offer or declines the offer, dropping the non-responsive routing target from the optimal list and returning to step (e3);
   (e5) if the routing target to which the synchronous interaction was offered accepts the offer, selecting the accepting routing target as the final routing target for the synchronous interaction and proceeding to step (f);
   (e6) if the optimal list is empty and no routing target was selected, executing a target unavailable script in the interpreter server for the synchronous interaction.

6. A system for optimized and distributed routing of synchronous interactions, the system comprising:
- a plurality of interpreter servers stored and operating on network-attached computers, each adapted to interpret a plurality of scripts to manage a plurality of synchronous interactions of one or more specific media types drawn from a list comprising: analog telephone calls, digital telephone calls, video calls, or instant messaging or web chat sessions;
- a plurality of statistics servers stored and operating on a network-attached computer and coupled to one or more of the plurality of interpreter servers;
- a historical statistics database accessible via a network and adapted to receive and store statistical information from the plurality of statistics servers; and
- a plurality of optimization servers stored and operating on network-attached computers;
- wherein upon receiving or initiating a synchronous interaction of a specific media type drawn from the list, a first interpreter from the plurality of interpreter loads a first script based at least on an interaction identifier and a collection of interaction-specific data;
- further wherein the plurality of statistics servers receive event notifications from the plurality of interpreter servers regarding events pertaining to a plurality of specific synchronous interactions handled by the plurality of interpreter servers, and the statistics server computes one or more statistics for use in routing based on the received event notifications; and
- wherein the interpreter server executes, using statistical data from the statistics server and data from the historical statistics database, a script to determine at least a specific handling policy for the interaction of a specific media type, and thereby routes the synchronous interaction to a specific target resource; and
- wherein the script comprises at least the steps of generating a list of all possible routing targets capable of handling the synchronous interaction regardless of the real-time state of the routing targets of readiness to receive a synchronous interaction using at least an interaction identifier and a plurality of data elements pertaining to the synchronous interaction, computing a plurality of fitness parameters for each routing target in the generated list, sorting the generated list based on one or more of the fitness parameters using a sorting rule to obtain a sorted target list, and using a target selection rule to consider a plurality of routing targets starting at the beginning of the sorted target list until a routing target is selected.

* * * * *